United States Patent [19]

Tanaka et al.

[11] Patent Number: 4,802,097

[45] Date of Patent: Jan. 31, 1989

[54] CONTROL SYSTEMS OF INJECTION MOLDING MACHINES

[75] Inventors: Hideo Tanaka; Saburo Bannai; Kiyoshi Sasaki; Tsuginobu Totani, all of Numazu, Japan

[73] Assignee: Toshiba Kikai Kabushiki Kaisha, Tokyo, Japan

[21] Appl. No.: 32,787

[22] Filed: Mar. 31, 1987

[30] Foreign Application Priority Data

Apr. 1, 1986 [JP] Japan .................. 61-075068
Jun. 17, 1986 [JP] Japan .................. 61-141089

[51] Int. Cl.$^4$ .................. B29C 45/00; G06F 15/00
[52] U.S. Cl. .................. 364/476; 364/132; 425/135; 425/143
[58] Field of Search .................. 264/40.1; 425/135, 143, 425/144; 364/131, 132, 184, 185, 476, 474

[56] References Cited

U.S. PATENT DOCUMENTS

| | | | |
|---|---|---|---|
| 4,281,378 | 7/1981 | Austin | 364/132 |
| 4,288,849 | 9/1981 | Yoshida et al. | 364/132 |
| 4,421,468 | 12/1983 | Bokelmann | 364/132 X |
| 4,519,026 | 5/1985 | Nozawa et al. | 364/188 X |
| 4,543,639 | 9/1985 | Inaba et al. | 364/513 |
| 4,549,276 | 10/1985 | Inaba et al. | 364/513 |
| 4,674,053 | 6/1987 | Bannai et al. | 364/476 |
| 4,695,237 | 9/1987 | Inaba | 364/476 |

Primary Examiner—Jerry Smith
Assistant Examiner—Allen MacDonald
Attorney, Agent, or Firm—Koda and Androlia

[57] ABSTRACT

In an injection molding machine combined with a peripheral apparatus, control units capable of interchanging signals are provided for the molding machine and the peripheral apparatus. Each control unit comprises a memory device storing set molding data applied with numbers or identifications. When the control unit of the molding machine sends the set data number or identification to the control unit of the peripheral apparatus to read out from the memory devices, the set molding data are formed when the numbers or identifications coincide with each other.

6 Claims, 5 Drawing Sheets

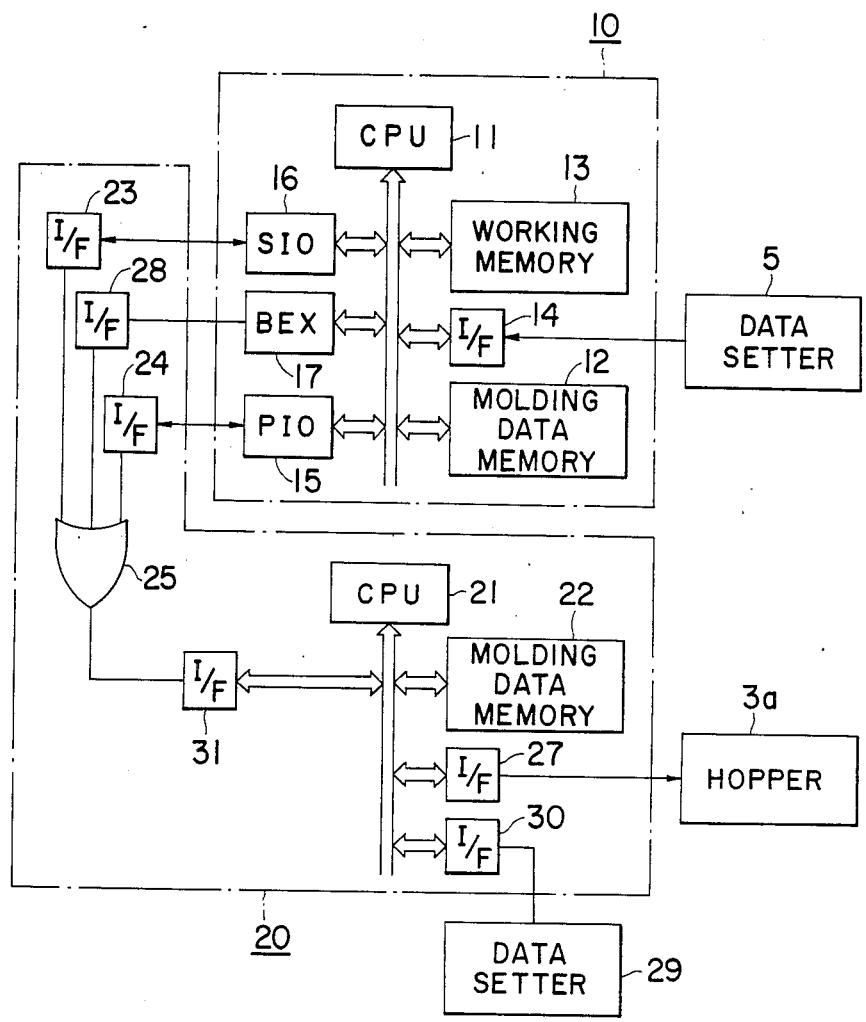
F I G. 1

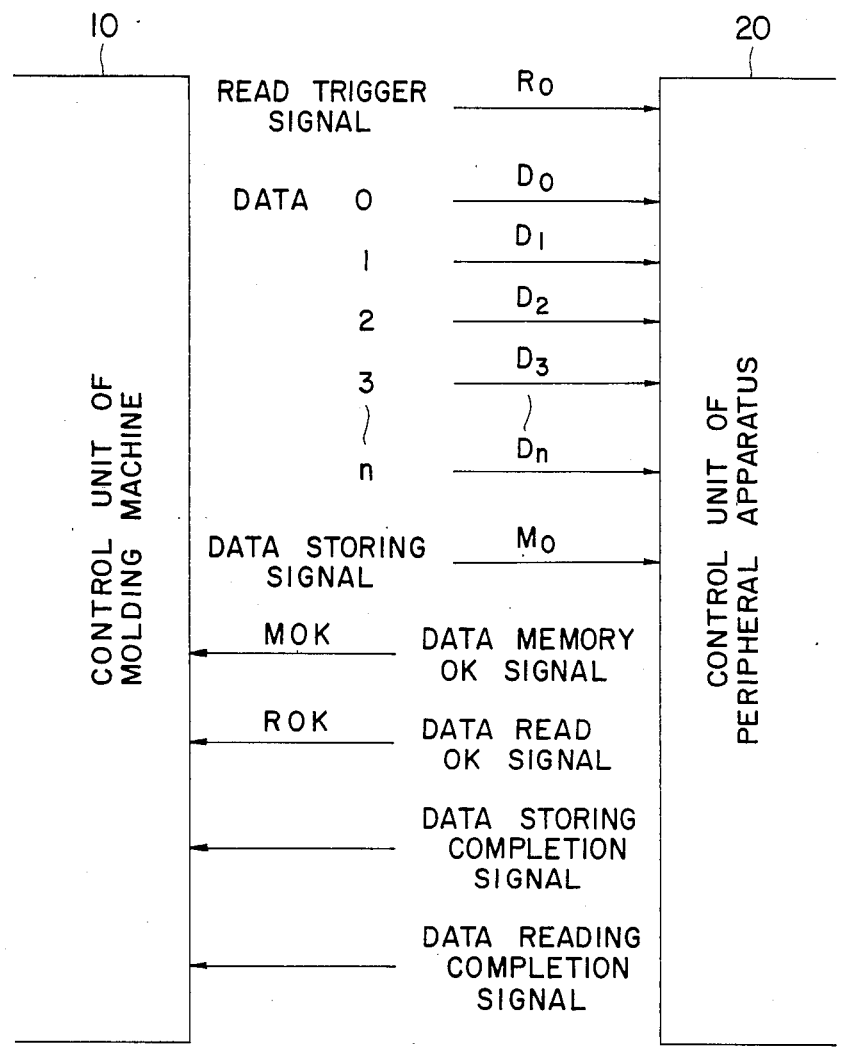
F I G. 4

CONTROL SYSTEMS OF INJECTION MOLDING MACHINES

BACKGROUND OF THE INVENTION

This invention relates to a control system of an injection molding machine and a temperature control device utilized thereby.

As is well known in the art, a conventional molding machine comprises a pair of metal molds, a mechanism for opening, closing and clamping the metal molds, and an injection mechanism including a heater for melting a plastic material and an injection piston or screw for injecting molten plastic into closed metal molds. The clamping mechanism comprises a product take-out device designed to change the method of taking out the product in accordance with the size and configuration thereof and to change the injection stroke. The hopper, the product take-out device, etc. are hereinafter termed a peripheral apparatus.

It has been desired to automate the control system of the injection molding machine described above. However, it is difficult to design the control system to have all control performances for the injection molding machine (main body) itself and for the peripheral apparatus. For this reason, respective peripheral apparatus are designed to have necessary control performances commensurate with molding conditions.

More particularly, for a hopper, one of the peripheral apparatus, it is necessary to switch the control performances therefore for different raw material plastics, and for a product take-out device it is necessary to design the control system such that exchange of a chuck and variation of the injection stroke can be automatically made in accordance with the molded product.

Certain specifications of the injection molding machine do not require to attach some sort of peripheral apparatus. Moreover, the operation mode and the connection of the peripheral apparatus are not equal for products of different makers.

For this reason, unless the capacity of memory means of the main body of the injection molding machine is increased, it is impossible to store all molding condition set data for all peripheral apparatuses.

Even if the memory capacity were increased, each time a machine maker incorporates a different peripheral apparatus it is necessary to change the entire program of the memory means.

For this reason, the control systems for respective peripheral apparatus have been constructed to have different control performances commensurate with the molding conditions. In order to completely automate the control system of an injection molding machine incorporated with peripheral apparatus requiring various control performances commensurate with different molding conditions, it has been the greatest problem how to construct the overall control system for the entire injection molding equipment.

Among the peripheral apparatus is also included a temperature control device for controlling the temperature of the plastic heating cylinder. In recent years, a temperature control device has been used capable of preventing breakage and excessive temperature rise of the heating cylinder caused by the overheating of an electric heater.

Prevention of breakage caused by the overheating of the heater can be accomplished by detecting breakage of a thermostat, but where the thermostat is not satisfactorily inserted into a portion whose temperature is to be detected, as the fault is not caused by the breakage of the thermostat, such fault cannot be detected with a prior art device which detects the breakage of the electric heater. As a consequence, the heater continues to operate until it is broken by overheating. Furthermore, the overheating of the heating cylinder cannot be confirmed unless the operator observes whether the needle of the temperature control device reaches a set vale to ON-OFF control the heater.

SUMMARY OF THE INVENTION

It is therefore an object of this invention to provide an improved control system for an injection molding machine capable of providing accurate controls irrespective of whether a certain peripheral apparatus is not incorporated or peripheral apparatus having different operation modes or connections are incorporated into the main body of the injection molding machine.

Another object of this invention is to provide an improved temperature control device especially useful for the injection molding machine and which can prevent breakage and overheating of a heating cylinder caused by overheating of an electric heater.

According to this invention there is provided a control system of an injection molding machine incorporated with a peripheral apparatus, comprising control units respectively provided for the molding machine and the peripheral apparatus and each of the control units including means for exchanging signals therebetween, each control unit having memory means for storing set molding data expressed by numbers or identifications, means for transmitting from the control unit of the molding machine to the control unit of the peripheral apparatus a number or an identification memory means of the control unit of the molding machine, and means for reading out from the memory means set molding data as molding data whose numbers or identifications coincide with each other.

The injection cylinder of an injection molding machine is generally heated by an electric heating means. According to a modified embodiment of this invention there is provided temperature control means for displaying the temperature of the heating cylinder of the injection molding machine heated by electric heating means, comprising means for calculating percentage of current conduction flowing through the electric heating means, and means for displaying the result of the calculation when the result of calculation exceeds a predetermined value. In response to the display or alarm the operator of the machine stops energization of the electric heating means or inspects it.

BRIEF DESCRIPTION OF THE DRAWINGS

In the accompanying drawings,

FIG. 1 is a block diagram showing one embodiment of the control system according to this invention;

FIG. 4 is a diagram showing the relationship between the control units of the main body of an injection molding machine and of a peripheral apparatus;

DESCRIPTION OF THE PREFERRED EMBODIMENTS

Figure 2:
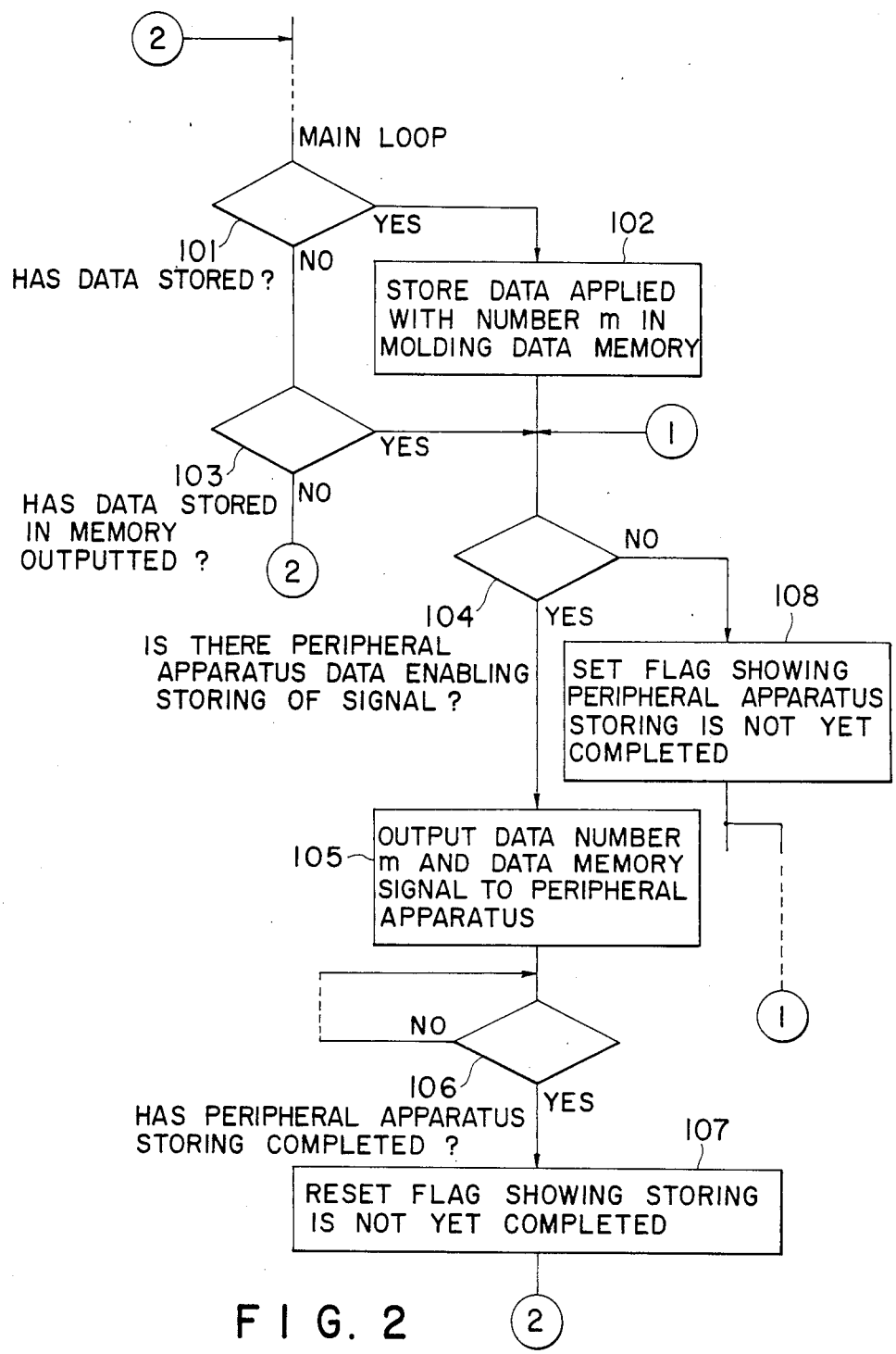
FIGS. 2 and 3 are flow charts utilized to describe the operation of the embodiment shown in FIG. 1.

The control system of this invention shown in FIG. 1 comprises a control unit 10 for the main body and a control unit 20 for a peripheral apparatus. Although each of the peripheral apparatus is provided with a control unit, FIG. 1 shows the control unit for only one peripheral apparatus.

The control unit 10 is essentially constituted by a microcomputer including a central processing unit (CPU) 11, a molding data memory means 12, a working memory means 13 utilizing RAMs respectively, an interface 14 taking in a set value of a data setter 5, an input/output device (PIO) 15 inputting and outputting parallel data, an input/output device (SIO) 16 inputting and outputting serial data, and a bus line input/output device (BEX) 17.

Also the control unit 20 is essentially constituted by a microcomputer including a CPU 21, molding data memory means 22 utilizing a RAM, a data setter 29, an interface 30 connected between CPU 21 and data setter 29, interfaces 23, 24 and 28 respectively connected between control units 10 and 20, an OR gate circuit 25 connected between interfaces 23, 24 and 28, and CPU 21 via an interface 31 and an interface 27 applying a control signal to a hopper 3a, one of the peripheral apparatus.

The operation of the embodiment shown in FIG. 1 will now be described with reference to the flow charts shown in FIGS. 2 and 3 and a diagram shown in FIG. 4. Although data transferred can be designated by numbers or names (identifications), in the following a case wherein numbers are applied to the data will be described.

At the time of the test operation of the injection molding machine, the operating conditions of the main body and the peripheral apparatus are set respectively by data setters 5 and 29 mounted on a control panel 40 (see FIG. 6) and when a satisfactory product is obtained the setter 5 is operated to form molding data using set values of a MAN-MACHINE interface, not shown, and numbers are applied to the molding data for storing them in molding data memory means 12 and 22, at steps 101 and 102 shown in FIG. 2. The data memory means 12 has a capacity of storing molding data regarding n molds, whereas the working memory means 13 stores actually used molding data, that is the working data, so that by loading the data stored in the molding data memory means 12 in an actual working set data area, the molding machine can be actually operated as if the data were set by the data setter 5.

Figure 3:
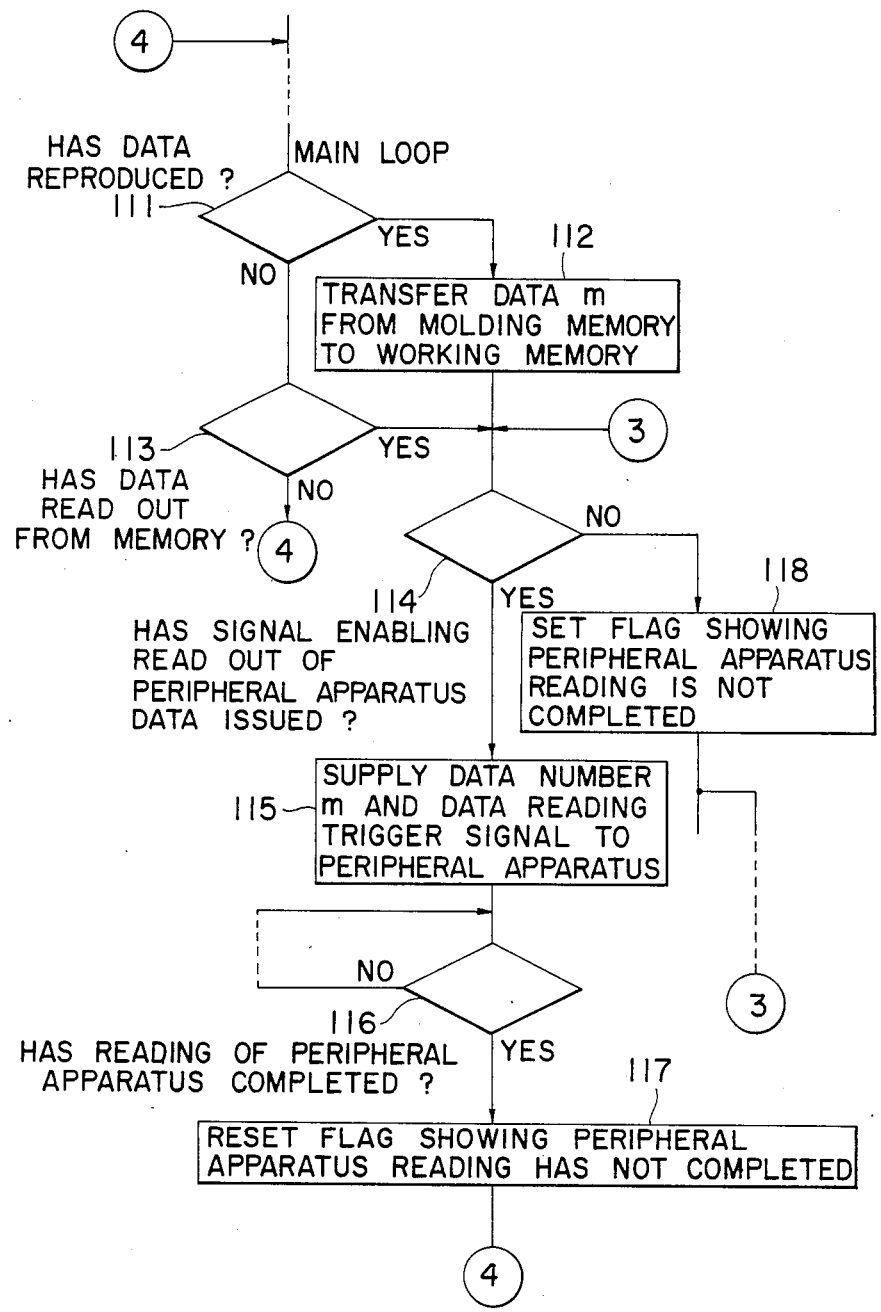

In the control unit 20 for the peripheral apparatus, among the working data described above, data of respective peripheral apparatus are stored after being applied with proper numbers. The data setter 5 is operated to transfer data, or the data are transferred automatically in accordance with a memory instruction when the control unit 20 is in a condition for receiving the data, the data numbers are written into the CPU 21 via data input/output device 15 or 16, so that the data set by the data setter 29 are stored in the data memory means 22 after being applied with transferred data numbers at steps 103 through 108 shown in FIG. 2, as will be described later in detail.

Where the contents of the working memory means 13 of control unit 10 and the data memory means 22 of the control unit 20 are to be read out and reproduced, the proceedings shown in the flow chart shown in FIG. 3 are executed.

The flow charts shown in FIGS. 2 and 3 will now be described in detail.

At step 101 shown in FIG. 2, a judgement is made as to whether the data has been stored in the memory means 12. When the result of judgement is YES, the data applied with a number m is stored in the molding data memory means 12, whereas when the result of judgement is NO, at step 103, a judgement is made as to whether the data stored in the memory means has been read out to the outside or not. When the result of this judgement is YES, at step 104, a judgement is made as to whether there is peripheral apparatus data enabling storing of a signal or not. When result of this judgement is NO, at step 108, a flag showing the fact that a peripheral apparatus has not yet stored data is set; whereas when the result of judgement at step 104 is YES, at setp 105, the data number m and a data memory signal are outputted to the peripheral apparatus. Then, at step 106, a judgement is made as to whether the storing of data in the peripheral apparatus has been completed or not. When the result of this judgement is NO, the program is returned to step 106 to repeat the judgement, whereas when the judgement executed at step 106 is YES, at step 107, a flag showing that storing is not completed is reset.

Then the program proceeds to the flow chart shown in FIG. 3. Thus, at step 111, a judgement is made as to whether the data has been reproduced. When the result of this judgement is YES, at step 112, a data with data number m is transferred to the working memory means 13 from the molding data memory means 12; whereas when the result of the judgement is NO, at step 113, a judgement is made as to whether the data has been read out from the memory means or not. After that, at step 114, a judgement is made as to whether a signal enabling reading out a pheripheral apparatus data has issued or not. When the result of this judgement is NO, at step 118, a flag showing that reading of peripheral apparatus data has not yet been completed is set. On the other hand, when the result of judgement executed at step 114 is YES, at step 115, the data number m and a data reading trigger signal are supplied to the external (peripheral) apparatus. Then at step 116, a judgement is made as to whether the reading of the peripheral apparatus data has completed or not. When the result of this judgement is NO, the program is returned to step 116 to repeat the judgement, whereas when the result of judgement is YES, at step 117, the flag showing that the peripheral apparatus data reading is not completed is reset.

FIG. 4 shows the relation between sending and receiving of signals where parallel data are transferred to control unit 20 by using input/output device 15. "Data storing OK signal MOK" shows that the peripheral apparatus are in a state in which the data can be stored so that the control unit 20 of the peripheral apparatus can receive a "Data storing signal Mo". "Data read OK signal ROK" shows that the control unit 20 can reproduce a new data in response to a "Read trigger signal Ro" sent from the control unit 10.

The "Data memory signal Mo" comprises a memory timing signal when the control unit 20 outputs a "Data memory OK signal MOK", and a "Read trigger signal Ro" acts as a reproduce timing signal outputted from the control unit 10 when the control unit 20 outputs a "Data read OK signal ROK".

On the other hand, outputting of a serial data by using input/output device 16 can be made by using a protocol similar to that described above. It is also possible to input and output data and control signals by using BEX 17 after extending the bus line of the control unit 10 to enable it to output signals to the peripheral apparatus.

Although in the foregoing embodiment, dry contacts were used for setting and outputting data, such systems as transistor-transistor-logic (TTL), RS2320 and RS422 and a current output can be used.

As above described, according to this invention the injection molding machine and peripheral apparatus thereof are respectively provided with memory means storing set molding data in the form of numbers so as to transmit set data numbers from the control unit of the injection molding machine to the control unit of the peripheral apparatus whereby these control units read out set molding data whose numbers coincide with each other. For this reason, even when a certain peripheral apparatus is not incorporated or even when it is necessary to incorporate peripheral apparatus having quite different operating modes or connection relations, the control system of this invention can readily cope with such situations.

Figure 6:
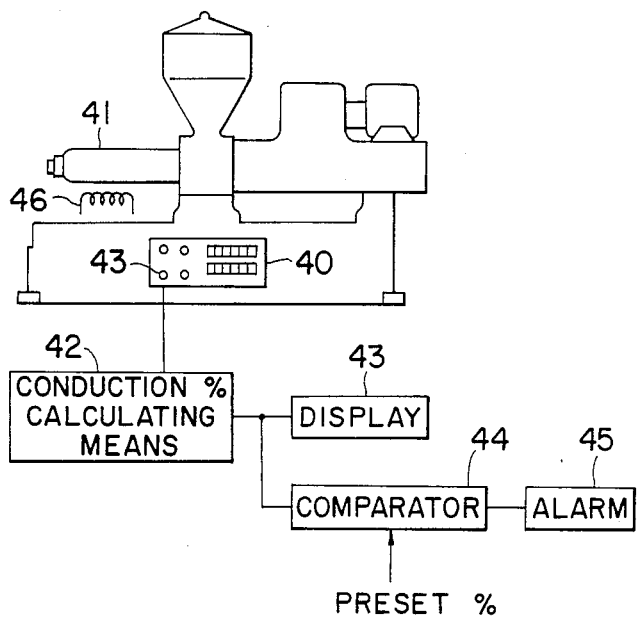
FIG. 6 is a diagrammatic representation of a temperature control device embodying the invention.

As is well known in the art in a conventional injection molding machine, a control panel 40 is mounted on a suitable portion of the main body of the machine as shown in FIG. 6. In addition to the data setters 5 and 29 shown in FIG. 1, a temperature control device, a pressure indicating meter and various operating keys are also mounted on the control panel 40.

Figure 5:
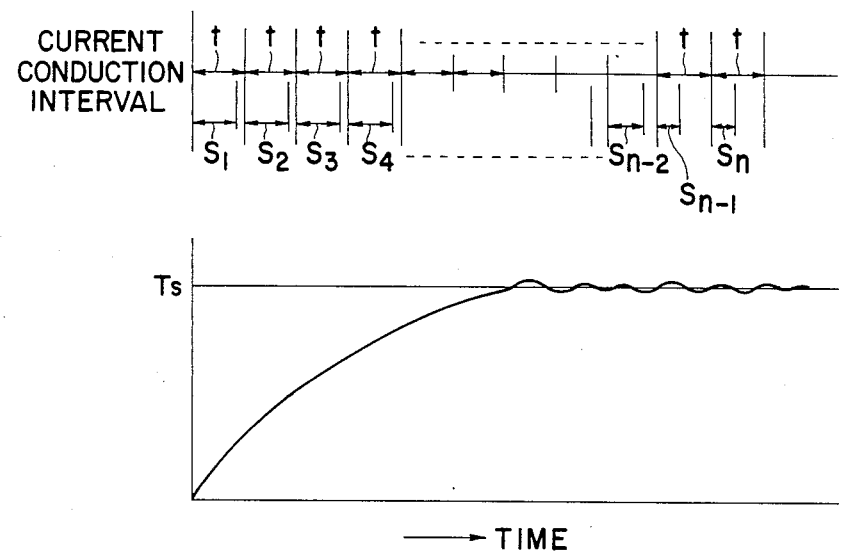
FIG. 5 is a graph showing the relation between the time and temperature variation of the temperature control device according to this invention.

Turning now to FIG. 5 showing the relationship between temperature variation with time and the period of current passing through an electric heater 46 or conduction period, it is assumed that until the temperature of the heating cylinder 41 of an injection molding machine reaches a set value Ts, current is passed through the heater 46 for an interval Sn with respect to a definite interval t, a ratio Sn/t is approximately 1 meaning that the percentage of current conduction is about 100~80%. After the set temperature Ts has been reached it is only necessary to pass current to maintain the set temperature Ts whereby the ratio Sn/t becomes to about 0.5~0.6, that is, the percentage of current conduction is 50~60%.

Consequently, the percentage of current conduction can be calculated as follows.

An actual conduction period in a definite interval nt is shown by:

$$S_1+S_2+S_3+\ldots+S_n=\Sigma S_n$$

Hence the percentage of current conduction becomes:

$$\frac{\Sigma S_n}{nt_1} \times 100\%$$

Since the percentage of current conduction is calculated in this manner, when the result of calculation exceeds a preset percentage an alarm can be issued whereby the operator is not required to constantly supervise the temperature indicating meter. Moreover, the response speed is much faster than the prior art device so that it is possible to prevent overheating of the heating cylinder and breakage of the electric heater due to overheating. Furthermore, it is possible to determine different characteristics of different materials from the heat capacity of the heating cylinder.

In FIG. 6, when a key or a push button 43 provided for the control panel 40 is operated, current conduction % calculating means 42 which may be a microcomputer calculates the current conduction period according to the equations described above. The result of calculation is displayed on a display device 43. The result of calculation is also applied to a comparator 44 which, when the result of calculation exceeds a preset percentage, operates an alarm device 45. Then the operator of the machine decreases the current flowing through the electric heater 46 provided for the heating cylinder 41, or inspects the electric heater.

What is claimed is:

1. A control system of an injection molding machine with a peripheral apparatus, comprising:
   control units respectively provided for said molding machine and said peripheral apparatus and each of said control units including means for exchanging signals between said control units;
   each control unit having memory means for storing set molding data expressed by numbers or identifications;
   means for transmitting from the control unit of said molding machine to the control unit of said peripheral apparatus a set data number or an identification; and
   means for reading out from said memory means of said injection molding machine and of said peripheral apparatus set molding data from said memory means respectively of said control units as molding data whose numbers or identifications coincide with each other.

2. The control system according to claim 1 further comprising a data setter and wherein said control unit for said injection molding machine comprises a working memory means, said molding data memory means of said molding machine control unit, serial data input/output means, parallel data input/output means, and external input/output means BEX, and a first central processing unit connected to all of said means of said injection molding machine control unit and said data setter.

3. The control system according to claim 2 wherein said control unit for said peripheral apparatus comprises a second central processing unit, an OR gate circuit with input terminals connected to said serial data input/output means, said parallel data input/output means and said external input/output means BEX respectively and an output terminal connected to said second central processing unit, and said molding data memory means of said peripheral apparatus control unit connected to said second central processing unit.

4. The control system according to claim 3 further comprising a second data setter connected to said second central processing control unit.

5. The control system according to claim 1 further comprising a control panel mounted on said injection molding machine and provided with a key or a push button, and a temperature control means for displaying a temperature of a heating cylinder of said injection molding machine heated by an electric heating means, said temperature control means comprising means responsive to an operation of said key or push button for calculating percentage of electric current flowing through said electric heating means, and means for displaying a result of the calculation.

6. The control system according to claim 5 further comprising means for issuing an alarm when said result of calculation exceeds a predetermined value.

* * * * *